Figure 1:
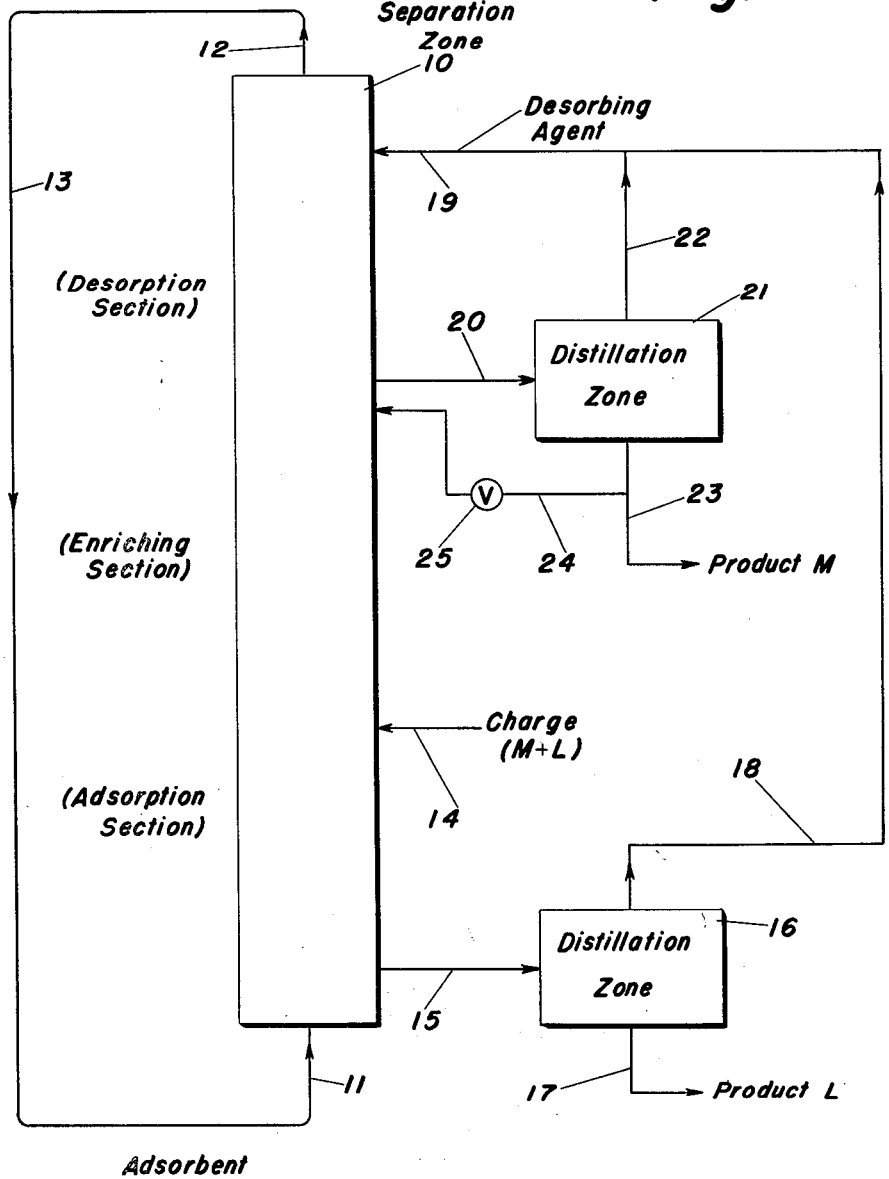

Feb. 12, 1952     J. L. OLSEN     2,585,490
CONTINUOUS ADSORPTION PROCESS
Filed March 31, 1949     3 Sheets-Sheet 3

INVENTOR.
JOHN L. OLSEN

Patented Feb. 12, 1952

2,585,490

UNITED STATES PATENT OFFICE 2,585,490

CONTINUOUS ADSORPTION PROCESS

John L. Olsen, Upland, Pa., assignor to Sun Oil Company, Philadelphia, Pa., a corporation of New Jersey Application March 31, 1949, Serial No. 84,590

9 Claims. (Cl. 260—674)

This invention relates to the separation of organic materials by selective adsorption. More particularly it relates to a continuous method for effecting separation of components from a liquid organic mixture, in which method a selective adsorbent is utilized in the form of a moving bed.

It is well recognized that different types of organic compounds often have different adsorbabilities on various known adsorbents and that such compounds may be separated to an extent from each other by treatment of a charge mixture with a suitable adsorbent. For example, it is known that highly polar organic compounds may be removed from less polar or non-polar organic substances by selective adsorption on various adsorbents. Likewise it is known that hydrocarbons may be selectively separated according to chemical type by means of certain adsorbents, such as silica gel or activated carbon. Usually the hydrocarbons which are less saturated, i. e. which have more double bonds per molecule, are adsorbed preferentially to those which are more highly saturated. Thus the affinity of adsorbents for the several types of hydrocarbons usually increases in the following order: saturate hydrocarbons (i. e. paraffins and naphthenes); olefins; aromatics. The treatment of a mixture composed of two or more of such types of hydrocarbons with a suitable adsorbent accordingly will tend to effect separation according to chemical type. For instance, aromatics or olefins or both can be preferentially separated from saturate hydrocarbons, or aromatics can be selectively removed from olefins, by means of suitable known adsorbents.

The usual procedure for carrying out selective adsorption operations with a liquid charge mixture is merely to filter the charge through a stationary body of the adsorbent until its effectiveness for making a further separation of the components has decreased to an uneconomic level. Introduction of the charge is then discontinued and the adsorbate is removed from the contact mass. This may be accomplished by washing with a suitable solvent, heating, blowing with a gas such as steam or flue gas, or by a combination of such methods. The adsorbent is then re-used for further treatment of charge material in another cycle of operation.

The above described prior art procedure utilizing the adsorbent in the form of a stationary bed entails certain inherent disadvantages, especially in that the composition of product from the adsorption zone varies throughout the cycle therefore requiring proper selection and segregation of product cuts. Also, an intermediate portion of the filtrate product is apt to be of composition approaching that of the charge thus limiting the yields of desired product. Further, the decline in activity of adsorbent during use over a prolonged time necessitates shutting down the operation for replacement, as continuous replacement in amount sufficient to maintain the desired activity is not practicable where the adsorbent is maintained as a stationary body.

The present invention is directed to a continuous process for effecting separations by selective adsorption in which the adsorbent is utilized in the form of a moving bed. The process may be so regulated as to effect substantially any desired degree of separation between the charge components, and the products obtained under any selected set of operating conditions will be of substantially constant composition at all times during the operation. The process also lends itself to continuous replacement of the adsorbent, if desired, so that the activity of the circulating adsorbent may be maintained at a constant level.

Briefly, the process according to the invention comprises continuously introducing adsorbent into a separation zone and passing it therethrough in the form of a moving bed. A stream of liquid charge material is continuously fed into the moving bed at a locus intermediate the ends of the separation zone. Product comprising the less adsorbable component in enriched form is withdrawn from the separation zone near the end at which the adsorbent is introduced. A suitable organic solvent is continuously fed into the separation zone adjacent its other end to function as a desorbing agent for displacing the more adsorbable component from the adsorbed phase. A mixture of desorbing agent and the more adsorbable component is withdrawn from the zone at a locus intermediate the loci of introduction of charge and desorbing agent. Wet adsorbent leaving the separation zone and carrying adsorbed solvent is returned, without removal of the solvent, directly to the other end of the zone for re-use in the operation.

Any adsorbent which will preferentially adsorb one type of component in the particular charge mixture to be separated may be used in conducting the process. Preferably an adsorbent which has a high adsorption capacity and a high degree of selectivity between the components of the charge mixture is employed. Among the commercially available adsorbents silica gel and activated carbon have adsorptive properties which are especially suitable for separating many types of organic mixtures to which the present process is applicable. Silica gel is especially effective for selectively adsorbing a more highly polar compound from a less highly polar compound or for separating hydrocarbons having different degrees of saturation. Activated carbon is also effective for separating hydrocarbons according to chemical type and in some instances will, to an extent, separate hydrocarbons of the same type according to molecular weight. In many cases activated carbon is capable of selectively adsorbing non-polar compounds, for example hydrocarbons, from polar compounds, for example alcohols, ethers, esters, ketones, aldehydes, etc. It is to be understood, however, that the process according to the invention may be practiced with other types of adsorbents and in fact with any other adsorbent which exhibits a substantial selectivity between the components of the particular charge mixture to be treated.

Figure 2:
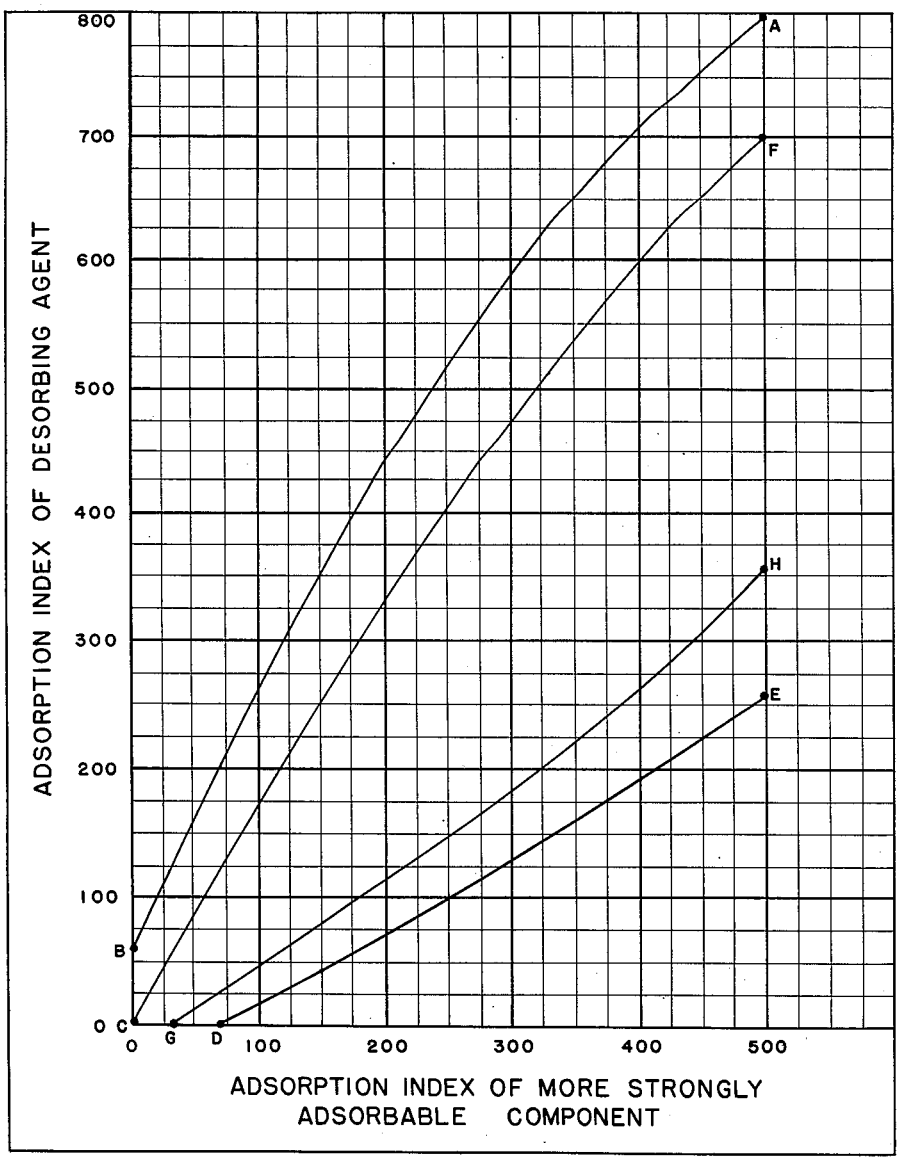
Figure 3:
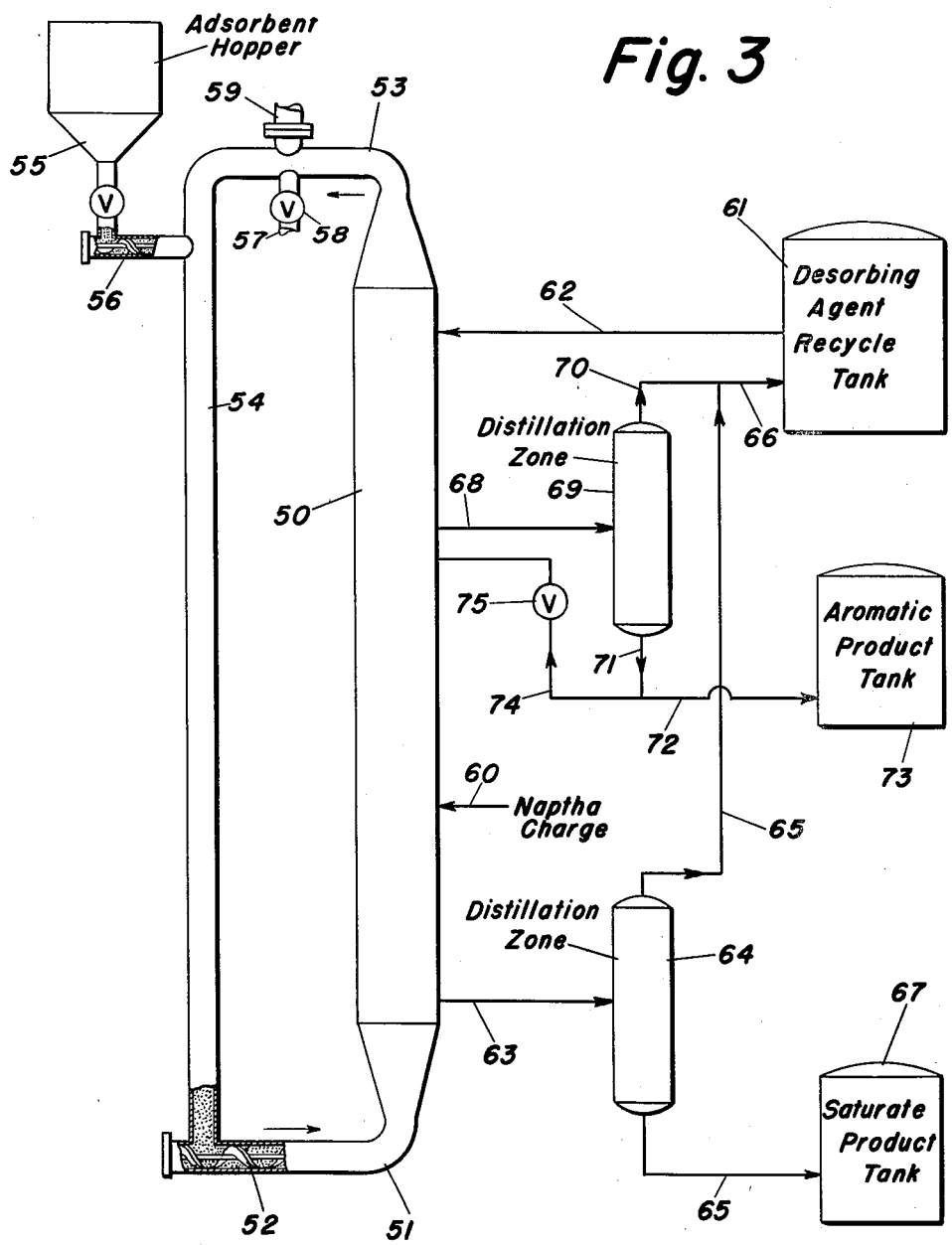

The description which follows is made with reference to the accompanying drawings in which:

Fig. 1 is a simplified diagrammatic illustration of the process;

Fig. 2 constitutes a chart useful in selecting a suitable desorbing agent for the process; and Fig. 3 is a diagrammatic view partly in section illustrating an installation adapted for practicing the process.

Referring first to Fig. 1, a separation zone 10 is illustrated in the form of an elongated column through which the adsorbent continuously passes as a moving bed. The adsorbent is introduced continuously through line 11 into the bottom of the column, moves upwardly through the column as a moving bed, and passes out of the top through line 12. The used adsorbent issuing from the top of the column is circulated through line 13 directly back to the bottom, without any intermediate treatment, for re-use in the operation.

The charge mixture, which for purposes of illustration may be considered to be composed of components M and L, with M being the more strongly adsorbable component, is fed in liquid form continuously into column 10 through line 14 at a level spaced substantially away from either end of the column, as illustrated in Fig. 1. As the charge mixture comes into contact with the moving adsorbent bed, component M will tend to be selectively adsorbed and carried upwardly while component L will tend to flow downwardly toward the bottom. Adjacent the bottom of the column a product stream which contains L in enriched form and also contains desorbing agent is withdrawn through line 15 and is then subjected to any suitable treatment for removing the desorbing agent from component L. A particularly convenient means for effecting such separation is by distillation, as illustrated diagrammatically by distillation zone 16. The resulting product rich in component L is withdrawn from the system through line 17, while the desorbing agent removed from distillation zone 16 is returned through line 18 for re-use in the process.

A stream of desorbing agent is continuously fed into column 10 near the top through line 19. Upon coming in contact with the adsorbent the desorbing agent tends to displace adsorbate which has been carried along with the adsorbent approaching the upper part of column 10 and thereby to prevent such adsorbate from passing out of the column with the adsorbent. In other words, a transfer of desorbing agent from the fluid phase within the interstices of the bed to the adsorbed phase takes place, while a reverse transfer of adsorbate, which is rich in component M, from the adsorbed phase to the fluid phase simultaneously occurs. Fluid phase constituting a mixture of desorbing agent and adsorbate is continuously withdrawn from the column through line 20 at a level intermediate the loci of introduction of charge and desorbing agent. The mixture passes into distillation zone 21 from which desorbing agent is removed through line 22 and returned to line 19 for re-use. Product comprising component M in enriched form is withdrawn from distillation zone 21 through line 23.

If desired a portion of product M may be returned in regulated amount through line 24 and valve 25 to column 10 at a level adjacent the level of withdrawal (line 20). The product so returned serves as reflux for the operation and may be referred to as outside reflux. It is to be understood, however, that such outside reflux is not essential for efficient operation of the process, since the same results may be achieved by proper regulation of the rates of introduction and withdrawal of the several streams relative to the adsorbent rate. Such regulation will produce internal reflux of displaced adsorbate material in the upper part of the column, which will have the same effect in improving the separation as when outside reflux is utilized.

While as illustrated in Fig. 1 the adsorbent moves upwardly through the separation zone, it is to be understood that the process may likewise be conducted with the adsorbent moving downwardly. In such case desorbing agent would be introduced at the bottom, product M would be withdrawn at a somewhat higher level, charge would be introduced at a still higher level and product L would be withdrawn near the top.

The above described process is somewhat analogous in principle to the conventional process for conducting fractional distillation although not strictly so. However, such analogy may be drawn as an aid in understanding the fundamental principles and the factors upon which the effectiveness of separation depends. It is well recognized that in order to attain a desired degree of separation of a mixture in fractional distillation the number of theoretical plates or transfer units employed and the reflux ratio used are important and interrelated. For any particular separation there is a minimum number of transfer units (corresponding to an infinite reflux ratio) and a minimum reflux ratio (corresponding to an infinite number of transfer units) that must be employed. These depend upon the relative volatility of the components being separated. As the number of transfer units is increased the necessary reflux ratio for obtaining the separation decreases. In practice the number of plates or transfer units and the corresponding reflux ratio are selected to give the most economical operation.

In the present process the selectivity of the adsorbent or in other words the relative adsorbabilities of the components is comparable to relative volatilities in distillation. The fluid phase in the interstices of the bed and the adsorbed phase on the adsorbent are analogous, respectively, to the liquid and vapor within a distillation column; and transfer of material between the fluid phase and the adsorbed phase is equivalent to the transfer between liquid and vapor in distillation. The adsorbate which is displaced from the adsorbed phase on the moving adsorbent in the upper part of the column is similar to reflux in distillation. There are a minimum number of transfer units and a minimum reflux ratio, dependent upon the relative adsorbabilities of the components being separated, below which values the particular degree of separation desired cannot be accomplished. Accordingly, the required number of transfer units and reflux ratio for operating the present process to achieve any given degree of separation may be determined from relative adsorbability data by means of engineering calculations similar to those used for distillation operations. In such manner the rates of addition and withdrawal of streams in the process and the required height of the column may be ascertained. The rate of movement of adsorbent through the column determines, together with its adsorptive capacity, the rate at which adsorbate moves upwardly, just as the boil-up rate in distillation determines the rate of flow of vapors. It is to be noted, however, that the addition of a third component (desorbing agent) near the top of the column and the return of adsorbent containing such third component in adsorbed phase to the bottom of the column constitute features which have no analogy in conventional fractional distillation. While these features complicate the calculations somewhat, nevertheless such calculations may be made upon principles fundamentally the same as used for distillation processes.

For convenience in describing the process as illustrated in Fig. 1 the separation zone or column 10 may be considered as comprising three different sections. The lower portion of the column, extending from the locus of introduction of the charge (line 14) down to the locus of removal of material rich in component L (line 15), may be referred to as an adsorption section. The upper portion of the column, extending from the locus of removal of product rich in M (line 20) up to the locus of introduction of desorbing agent (line 19), may be considered a desorption section. The section intermediate the above-named sections constitutes an enriching section. Pursuing further the analogy to distillation, the adsorption section is similar to the stripping section of a distillation column while the enriching section is analogous to a distillation enriching section. The desorption section functions in certain aspects like the condensation zone at the top of a distillation column, although it is not strictly analogous to the conventional condenser employed in fractional distillation due to the fact that a third component (desorbing agent) is introduced.

Desorbing agents which can be used in practicing the above described process may be classified generally as liquid organic solvents, that is, organic liquids in which the charge components are soluble or at least are soluble to such extent that there will be complete miscibility at the concentrations prevailing within the separation zone. It is preferable to use as desorbing agent a solvent which has complete miscibility with the charge components at all concentrations. When distillation is to be used to remove the desorbing agent from the products, it should have a boiling point substantially different from the charge components to permit ready separation. It is also preferable to select a desorbing agent which has a low viscosity so that its diffusion rate in the separation zone will not be excessive. It is essential that the desorbing agent selected have adsorbality characteristics falling within certain limits with respect to the adsorbability of the more adsorbable charge component (M), as more fully explained below. The desorbing agent may, within limits, be either less strongly adsorbable or more strongly adsorbable than component M on the particular adsorbent being used in the process. However, if it is too weakly adsorbed relative to component M, it will not be effective to displace M from the adsorbent in the upper part of the separation zone unless an unreasonably large proportion of desorbing agent is employed. On the other hand, if it is too strongly adsorbed, it will not be displaceable from the wet adsorbent returned to the bottom of the separation zone and therefore will render the adsorbent incapable of adsorbing charge material.

For the purpose of specifying the adsorbability characteristics of the desorbing agent to be used according to this invention, the concept of adsorption index is herein utilized. Such means of defining adsorptive properties of compounds have been described in Hirschler et al. Patent No. 2,441,572 in connection with another type of adsorption process utilizing a fixed adsorbent bed. For the present purpose the adsorption index of a compound may be defined as the apparent number of cubic centimeters of the compound adsorbed by one kilogram of the adsorbent when the latter is in equilibrium with a solution consisting of 0.2% of such compound and 99.8% of isooctane. (For a detailed discussion of the determination of adsorption index reference should be made to the above-mentioned patent to Hirschler et al.) The adsorption index may thus be considered as the amount of the compound adsorbed from a standard liquid at a standard concentration and therefore a measure of the affinity of the particular adsorbent used for the compound. A low adsorption index indicates a weakly adsorbable compound while a high adsorption index indicates one that is strongly adsorbable. The adsorption index for a given compound will vary of course with different types of adsorbents and in fact will vary even with different lots of the same type of adsorbent where the lots have different inherent activities. With any given adsorbent, however, the adsorption index for a particular compound will be fixed. Isooctane has been arbitrarily chosen as the standard liquid to use in determining adsorption index for the present purpose, but as a general rule other saturate hydrocarbons may be substituted for isooctane without substantially affecting the values obtained.

In determining whether an organic solvent will be suitable as desorbing agent where a particular charge mixture is to be separated in accordance with the invention, reference should be had to Fig. 2 which discloses a chart defining the upper and lower limits of adsorbability for the desorbing agent. To utilize Fig. 2 it is first necessary to know the adsorption index of the organic solvent in question and also the adsorption index of the more strongly adsorbable component (M) of the charge. The chart shows the maximum and minimum permissible limits of adsorption index for the solvent as a function of the adsorption index of component M and also preferred maximum and minimum values to insure more economic operation. The upper permissible limit is defined by the line AB, while the lower permissible limit is defined by the lines CD and DE. Thus if the point fixed by the adsorption index values for the two materials falls within the area ABCDE, the organic solvent will be operable as a desorbing agent in the process. Preferred desorbing agents, however, have an upper limit defined by the line FC and a lower limit defined by the lines CG and GH. Desorbing agents having the preferred characteristics will therefore fall within the area FCGH. As a general rule, the best desorbing agents to use are those having adsorption indices approximately the same as the more adsorbable component.

As a more specific illustration of the use of Fig. 2, assume for example that a mixture of M and L is to be separated and that M, the more adsorbable component, has an adsorption index of 150. By reference to Fig. 2, it can be seen that the desorbing agent used must have an adsorption index between about 45 and 350. Any organic solvent which is found to have an adsorption index within these limits would therefore be operative in the process. It would be preferable, however, to use a solvent having an adsorption index between about 80 and 250 so as to insure efficient operation.

As a further illustration, assume that a naphtha fraction boiling from say 300–400° F. and composed of aromatic and saturate hydrocarbons is to be separated into an aromatic product and a saturate product, employing silica gel as the adsorbent. In such case the aromatics may have an adsorption index in the neighborhood of 30, subject to some variation dependent upon the inherent activity of the silica gel used, while the adsorption index of the saturates based on isooctane will be approximately zero. Reference to Fig. 2 shows that the desorbing agent should have an adsorption index within the range of 0–120 and preferably within the range of 0–53. Suitable organic solvents for making the separation accordingly may readily be selected from compounds whose adsorption indices have been determined with silica gel of the same activity. Some typical values for various organic solvents with such silica gel are given in the accompanying table. The data show that there are numerous organic solvents which could be used for making the desired separation and that many of them come within the preferred range. Isoamyl chloride is shown to have adsorption properties near the upper limit of the preferred range. Solvents having adsorption indices relatively close to that of the aromatics being separated, such as, for example, chlorbenzene, methylene chloride, benzene, n-propylbromide, brombenzene, tert-butylchloride, toluene and ethylene dichloride, would be especially satisfactory desorbing agents in the process.

TABLE

*Adsorption indices of various organic solvents on silica gel*

| Compound | Adsorption Index |
|---|---|
| saturate hydrocarbons | about 0 |
| cyclohexene | 3.3 |
| trichloroethylene | 5.8 |
| 3-chloropentane | 8.2 |
| m-chlorobenzotrifluoride | 8.6 |
| chloroform | 12 |
| o-dichlorbenzene | 15 |
| chlorbenzene | 19 |
| methylene chloride | 21 |
| benzene | 24 |
| n-propylbromide | 26 |
| s-tetrachlorethane | 28 |
| brombenzene | 30 |
| tert-butylchloride | 31 |
| toluene | 31 |
| ethylene dichloride | 38 |
| iso-amyl chloride | 50 |
| benzotrichloride | 54 |
| 1, 2, 3-trichloropropane | 55 |
| benzyl chloride | 64 |
| benzal chloride | 90 |
| 1, 4-dichlorobutane | 91 |
| nitropropane | 101 |
| benzyl mercaptan | 136 |
| dioxane | 145 |
| nitrobenzene | 162 |
| m-nitrobenzotrifluoride | 181 |
| methyl salicylate | 189 |
| benzaldehyde | 190 |
| ethyl acetate | 195 |
| benzyl ether | 198 |
| pyridine | 204 |
| diisobutylketone | 212 |
| diisopropyl ether | 212 |
| m-aminobenzotrifluoride | 228 |
| cyclohexanol | 252 |
| sec-butyl alcohol | 260 |
| ethyl alcohol | 260 |
| 2-methyl-2, 4-pentanediol | 279 |
| n-butyl amine | 283 |
| morpholine | 286 |

One type of apparatus adapted for carrying out the present process is illustrated in Fig. 3. The apparatus comprises a vertical column 50 which is tapered at its upper and lower ends and through which particulate or finely divided adsorbent is continuously passed in the form of a moving bed. Adsorbent is fed into the bottom of the column through line 51 by means of a screw conveyor 52 which is capable of exerting sufficient pressure on the adsorbent to maintain it in compact form throughout the length of column 50 and to continuously effect its circulation. Adsorbent passes out of the column at the top through line 53 and thence into line 54 through which it returns to screw conveyor 52. The system is maintained full of adsorbent so that operation of the screw conveyor will continuously move the adsorbent in compact form through column 50 as well as the return lines. In case of loss of adsorbent from the system, as when very finely divided particles are carried along in the liquid streams withdrawn from column 50, additional adsorbent may be added to the system from hopper 55. For this purpose screw conveyor 56 is provided to transport adsorbent from the hopper into line 54, and such addition may be made continuously or intermittently as necessary to maintain the circulatory system substantially full at all times.

Means are also included for withdrawing adsorbent from the system, if necessary, either intermittently or continuously so that the average activity of the circulating adsorbent may be maintained at the desired level by addition of fresh adsorbent. Such means are illustrated in Fig. 3 in the form of line 57 containing valve 58. Provision may also be made for venting the system in order to allow for removal of any small amount of gases which may find their way into the system from time to time. Such venting means are illustrated in the form of a flanged connection 59 which includes a screen or finely perforated plate adapted to permit passage of gases from the system without loss of adsorbent. Similar connections (not shown) may be made at the points of introduction and withdrawal of the various liquid streams.

By way of illustration the process according to Fig. 3 may be considered as being operated for the purpose of separating a gasoline or naphtha fraction, for example, a naphtha boiling in the range of 300–400° F., into an aromatic product and a saturate hydrocarbon product. For such separation silica gel or activated carbon would be a particularly suitable adsorbent. As desorbing agent for the process any organic solvent of suitable boiling point selected by means of Fig. 2 in the manner described above would be suitable. For purpose of illustration the desorbing agent may be considered here to be a relatively low boiling aromatic, for example, benzene.

The naphtha charge is continuously fed into the moving adsorbent bed through line 60 and benzene as desorbing agent is continuously introduced from recycle tank 61 through line 62 into the column near the top. The liquid level within the column should be maintained at a height sufficiently above the level of introduction of the benzene so as to cause continuous flow of liquid downwardly through the bed by gravity but of course should not be permitted to reach the return pipe 53. A mixture of saturate hydrocarbons and benzene is withdrawn near the bottom of the column through line 63 and is passed into distillation zone 64 wherein the benzene is recovered, the latter being returned through line 65 and 66 to the recycle tank 61. The saturate product is removed from distillation zone 64 by way of line 65 and passes to product tank 67. A stream comprising a mixture of benzene and charge aromatics is withdrawn from column 50 through line 68 and is fed to distillation zone 69, the benzene being distilled off and passing through lines 70 and 66 back to recycle tank 61. The aromatic product passes from the bottom of distillation zone 69 through line 71 and thence by means of line 72 to product tank 73. If desired a regulated portion of the aromatic product may be returned through line 74 and valve 75 to the separation zone. As previously explained such outside reflux is not essential inasmuch as internal reflux may be obtained by proper regulation of the rates at which the several materials are introduced into and withdrawn from the column. Substantially any desired product purity may be obtained as to either the saturate or aromatic product or both by employing a column of sufficient height and by operating under the necessary reflux conditions.

It will be seen that the principles of the present invention are applicable to the separation of a great variety of organic mixtures, including not only hydrocarbons but also non-hydrocarbons. For instance, mixtures of various types of such compounds as listed in the foregoing table may be separated according to the present process. It is to be understood that the invention is not limited to the treatment of binary mixtures but also embraces multi-component mixtures containing one or more compounds having adsorbabilities intermediate those of the most adsorbable and least absorbable components. In such case the intermediate compound or compounds will tend to concentrate in one or the other of the products of the process depending upon whether the absorptive properties more nearly approach those of the most adsorbable component or of the least adsorbable component. Products so obtained may be retreated according to the invention to effect further separation.

Having described my invention, what I claim and desire to protect by Letters Patent is:

1. Continuous process for separating a liquid charge mixture of organic materials of different adsorbabilities which comprises: passing a particulate adsorbent in the form of a continuous moving bed through an elongated column having an adsorption section adjacent one end, a desorption section adjacent the other end and an intermediate enriching section, the adsorbent being introduced into the column at the adsorption section end and being withdrawn therefrom at the desorption section end; introducing in liquid phase into the moving adsorbent the liquid charge at a locus intermediate the adsorption and enriching sections and a liquid desorbing agent adjacent the end of the column at which adsorbent is withdrawn, said desorbing agent having an adsorption index falling within the area FCGH of Fig. 2; returning adsorbent, saturated with desorbing agent, as withdrawn from the column directly to the opposite end for re-use without further regeneration; flowing the liquid charge within said adsorption section countercurrent to the adsorbent to selectively adsorb the more adsorbable charge component therefrom while displacing desorbing agent from the adsorbent; withdrawing a liquid stream, rich in the less adsorbable charge component and containing desorbing agent, adjacent the end of the column at which adsorbent is introduced and separating desorbing agent therefrom by distillation; flowing a portion of the desorbing agent introduced into the column through said desorption section to desorb the more adsorbable charge component from the adsorbent; withdrawing a liquid stream comprising desorbing agent and more adsorbable charge component at a locus intermediate the enriching and desorption sections and separating desorbing agent therefrom by distillation.

2. Process according to claim 1 wherein a portion of the more adsorbable charge component product obtained upon distillation of the last-mentioned liquid stream is returned as reflux to said column at a locus adjacent the locus of withdrawal of said last-mentioned liquid stream.

3. Process according to claim 1 wherein the adsorbent is silica gel.

4. Process according to claim 1 wherein the adsorbent is activated carbon.

5. Continuous process for separating a petroleum charge composed of aromatic and saturate hydrocarbons into an aromatic product and a saturate product which process comprises: passing a particulate adsorbent in the form of a continuous moving bed through an elongated column having an adsorption section adjacent one end, a desorption section adjacent the other end and an intermediate enriching section, the adsorbent being introduced into the column at the adsorption section end and being withdrawn therefrom at the desorption section end; introducing in liquid phase into the moving adsorbent the petroleum charge at a locus intermediate the adsorption and enriching sections and an aromatic hydrocarbon liquid desorbing agent adjacent the end of the column at which adsorbent is withdrawn; returning adsorbent, saturated with desorbing agent, as withdrawn from the column directly to the opposite end for re-use without further regeneration; flowing the petroleum charge within said adsorption section countercurrent to the adsorbent to selectively adsorb charge aromatic therefrom while displacing desorbing agent from the adsorbent; withdrawing a liquid stream, rich in charge saturate and containing desorbing agent, adjacent the end of the column at which adsorbent is introduced and separating desorbing agent therefrom by distillation; flowing a portion of the desorbing agent introduced into the column through said desorption section to desorb charge aromatic from the adsorbent; withdrawing a liquid stream comprising desorbing agent and charge aromatic at a locus intermediate the enriching and desorption sections and separating desorbing agent therefrom by distillation.

6. Process according to claim 5 wherein a portion of the aromatic product obtained upon distillation of the last-mentioned liquid stream is returned as reflux to said column at a locus adjacent the locus of withdrawal of said last-mentioned liquid stream.

7. Process according to claim 5 wherein the adsorbent is silica gel.

8. Process according to claim 5 wherein the adsorbent is activated carbon.

9. Process according to claim 5 wherein the adsorbent is silica gel, the petroleum charge boils above the boiling point of benzene, and the desorbing agent is benzene.

JOHN L. OLSEN.

REFERENCES CITED

The following references are of record in the file of this patent:

UNITED STATES PATENTS

| Number | Name | Date |
|---|---|---|
| 2,441,572 | Hirschler et al. | May 18, 1948 |
| 2,470,339 | Claussen et al. | May 17, 1949 |